United States Patent [19]

Budd

[11] Patent Number: 4,800,845
[45] Date of Patent: Jan. 31, 1989

[54] DISPOSABLE PET FOOD DISH

[76] Inventor: Louise T. Budd, 304 Myrtle Ave., Mahwah, N.J. 07430

[21] Appl. No.: 142,268

[22] Filed: Jan. 5, 1988

Related U.S. Application Data

[63] Continuation of Ser. No. 897,026, Aug. 15, 1986, abandoned.

[51] Int. Cl.$^4$ ................................................ A01K 5/00
[52] U.S. Cl. ........................................ 119/61; 220/405
[58] Field of Search ............... 119/61; D7/138, 148; 220/405, 406

[56] References Cited

U.S. PATENT DOCUMENTS

| | | | |
|---|---|---|---|
| 2,677,350 | 5/1954 | Prestidge et al. | 119/61 |
| 3,195,510 | 7/1965 | Bernstein | 119/61 |
| 3,352,449 | 11/1967 | Jackson | 220/63 |
| 3,527,192 | 9/1970 | Ferrara | 119/61 |
| 3,565,245 | 2/1971 | Asher | D7/138 |
| 3,622,036 | 11/1971 | Bongaerts | 119/61 |
| 3,653,362 | 4/1972 | Davis | 119/61 |
| 3,698,594 | 10/1972 | Boehlert | 119/61 |
| 3,704,779 | 12/1972 | Nigg | D7/138 |
| 3,731,658 | 5/1973 | Livermore et al. | 119/61 |
| 3,922,476 | 3/1973 | VanNress et al. | 119/61 |
| 3,991,719 | 11/1976 | Bruce | 119/61 |
| 4,022,160 | 5/1977 | Lester | 119/61 |
| 4,257,353 | 3/1981 | Imhoff | 119/61 |
| 4,270,490 | 6/1981 | Kopp | 119/61 |
| 4,428,325 | 1/1984 | Koch | 119/61 |
| 4,532,891 | 2/1985 | Jones | 119/61 |

*Primary Examiner*—Paul J. Hirsch
*Attorney, Agent, or Firm*—Stevens, Davis, Miller & Mosher

[57] ABSTRACT

A disposable pet dish having a liner which may be attached to and then detached from a holder. The liner is provided with at least two depressions and the pet dish holder is provided with a raised portion which inserts into the depression to lock the liner into place. The holder and pet dish liner are both provided with sidewalls and bottom walls. The depression and raised portion are located on the sidewalls of the liner and holder, respectively. The liner is monolithically molded of one pieced and, preferably, the liner and a utensil are molded together as one piece. The molded piece is provided with a frangible connection to detach the utensil from the liner. Preferably, the utensil is a knife or spoon.

19 Claims, 2 Drawing Sheets

DISPOSABLE PET FOOD DISH

This application is a continuation, of application Ser. No. 897,026, filed Aug. 16, 1986, now abandoned.

BACKGROUND OF THE INVENTION

1. Field of the Invention

The present invention pertains to a disposable pet food dish, including a disposable liner and a holder for the liner. More particularly, the present invention pertains to a disposable liner which has a means for attaching itself to the holder by a snap-action, and which is also readily disengageable from the holder.

2. Discussion of the Prior Art

Feeding pets, such as dogs and cats, can be a particularly messy chore. Food which remains uneaten can spoil and leave behind an unpleasant odor. To promote hygiene, a conventional pet food dish should be cleaned separately from the dishes and other kitchen utensils employed by the human members of the household. Furthermore, if food does spoil, the conventional dish should be cleaned prior to putting fresh food therein. Cleansing minimizes or prevents illess to the pet caused by the presence of bacteria and/or toxins produced by the bacteria in the uneaten food.

It would be desirable to provide a disposable dish, thereby eliminating the unpleasant chore of washing the pet dish. However, a disposable dish which would have the structural strength to be self-supporting and not be upset by the pet during feeding would be expensive and bulky to package and store prior to use.

Merely providing a pet dish holder with a disposable liner is inadequate. This is because the pet, particularly a dog, could dislodge the liner from the holder during feeding.

The prior art, U.S. Pat. No. 3,698,594 to Boehlert disclosed, such as at FIG. 8, a disposable liner with a raised ridge and lock tabs in a receptacle. However, the disposable liner has a dish-like shape, a lip which overlays a portion of the receptacle and a locking ridge which circumscribes the entire liner. Thus, it appears that it would be difficult for a person to disengage the liner from the receptacle.

U.S. Pat. No. 4,257,353 to Imhoff discloses a disposable pet dish and support frame structure. However, an upper lip, attached to the disposable dish, snaps over and onto the support structure, making both assembly and disassembly of the liner and frame a difficult operation.

It would be desirable to provide a disposable pet dish to eliminate the need to clean a pet dish. It would also be desirable to provide a disposable pet dish having a liner which can be easily attached and detached from the support holder by the pet owner, and yet remains attached while the pet is feeding.

SUMMARY OF THE INVENTION

The present inventor has provided a means for securing the dish to the holder, which allows easy attachment and detachment of the liner from the holder. The present invention relates to a disposable pet dish which has a monolithic holder and a disposable liner. Preferably, the holder can be formed as a unitary structure, such as by injection or vacuum molding. However, it can also be formed of metal by stamping or forging. The holder has a bottom wall attached to sidewalls which extend upwardly and outwardly from the bottom wall and terminate in a rim having a lip projecting outwardly therefrom. A downwardly and outwardly extending outer wall is attached to the lip. The sidewalls are provided with two or more raised portions or mounds which protrude from opposing sidewalls of the holder.

The disposable pet dish is also provided with a pet dish liner, which comprises a bottom wall attached to sidewalls which terminate in a rim having a lip projecting outwards. Two or more depressions in the exterior wall of the liner, preferably at least one in each of two opposing sidewalls, are also provided. Preferably, the liner is monolithically molded of one piece of plastic, such as a copolymer of polyethylene or polypropylene.

Preferably, the liner and pet dish holder are asymetrically-shaped, most preferably rectangularly-shaped, so that the pet dish liner will only fit into the pet dish holder to guide the raised portions or mounds of the pet dish holder into the depressions of the pet dish liner. This particularly facilitates use of the dish by the elderly and disabled, such as the blind. In a preferred embodiment, a utensil is monolithically molded together with the liner as one piece. A frangible connection, such as perforations or other line of weakness in the molded piece, are provided so that the utensil can be separated from the liner. The frangible connection permits separation of the utensil and liner when the liner is used. Preferably, the utensil is a knife (spatula) or spoon.

It is an object of the present invention to provide a disposable pet dish having a liner which can be easily attached and detached to a holder by a person, but not be detached by a pet feeding from the dish.

It is another object of the present invention to provide a disposable pet dish wherein the sidewalls of the liner attach to the sidewalls of the holder.

DESCRIPTION OF THE PREFERRED EMBODIMENTS

Figure 1:
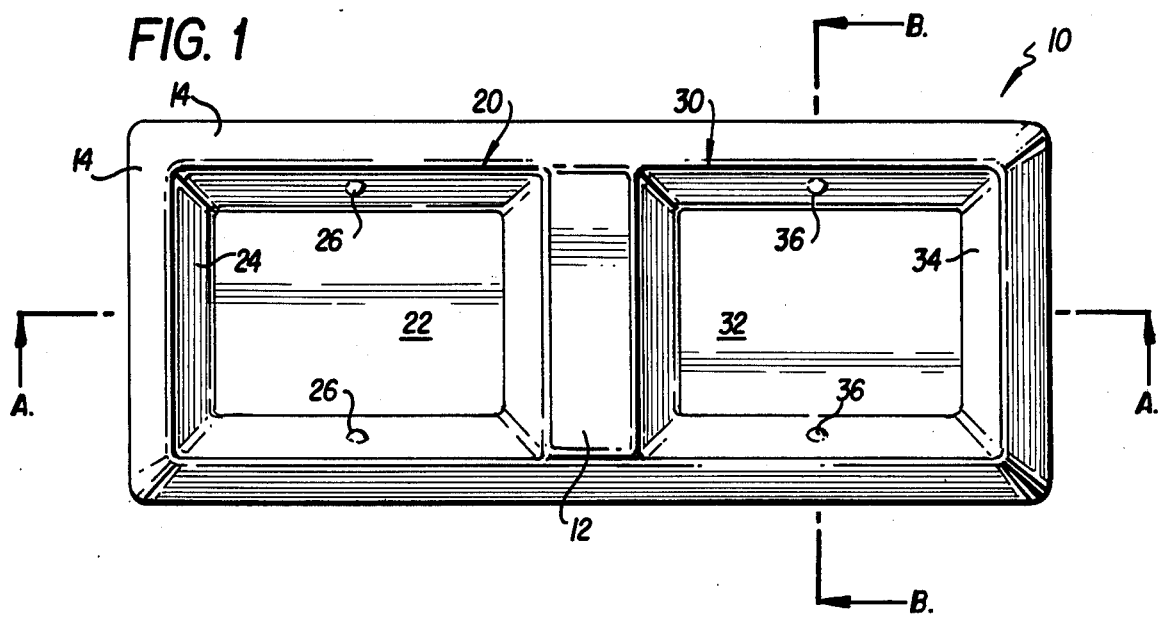
FIG. 1 is a top view of an embodiment of the pet dish holder of the present invention.
Figure 2:
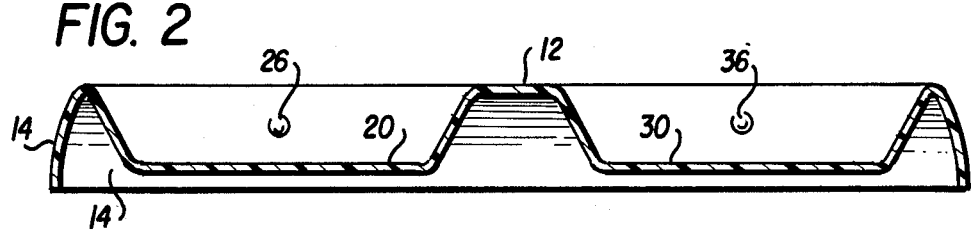
FIG. 2 is a side view of FIG. 1 along line A—A.
Figure 3:
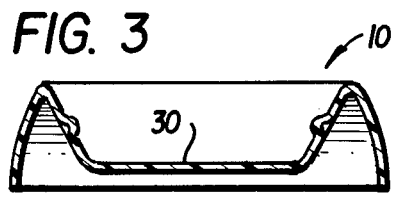
FIG. 3 is a front view of FIG. 1 along line B—B.
Figure 4:
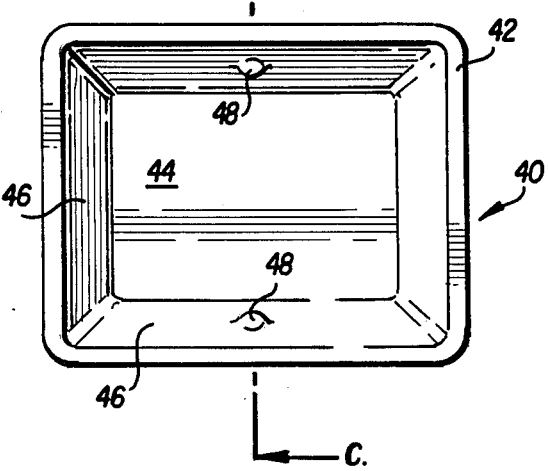
FIG. 4 is a top view of a liner of the present invention.
Figure 5:
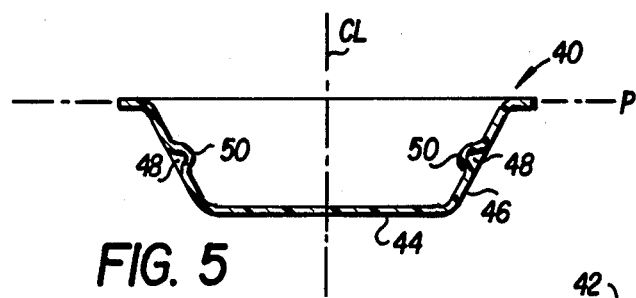
FIG. 5 is a front view of FIG. 4 along line C—C.

FIGS. 1-3 show a pet dish holder 10 for the pet dish liner 40, shown in FIG. 4. The pet dish holder 10 comprises two cavities 20, 30, each of which can hold one pet dish liner 40. The cavities are defined by bottom walls 22, 32, respectively, attached to sidewalls 24, 34, respectively, which extend upwardly and outwardly from the bottom walls and terminate in a rim having a lip projecting outwardly therefrom. The lips of cavities 20 and 30 merge to form a top wall 12 of the holder 10. A downwardly and outwardly extending outer wall 14 is attached to the topwall (lip) 12. Two or more raised portions or mounds 26, 36, respectively, protrude inwardly from opposing sidewalls 24, 34, respectively, of the cavities 20, 30.

FIG. 4 shows a pet dish liner 40 of the present invention comprising a bottom wall 44 attached to sidewalls 46, terminating in a rim having a lip 42. Lip 42 lies generally in plane P and projects outwardly of a nomical center line CL of the liner intersecting plane P. The liner 40 is further provided (as shown in FIG. 1) with two or more depressions 48 protruding inwardly from the exterior portion of sidewalls 46. Although the depressions are shown as forming a bulge 50 in the interior wall of the liner, the term "depressions" is also meant to describe an indentation in the wall of the liner which does not bulge the interior wall of the liner. The liner 40 can be monolithically formed of one piece and may be molded from a variety of plastic materials, such as polyethylene, polypropylene, polystyrene or other non-hazardous plastics. Polystyrene has the further advantage that it helps insulate the food placed in the liner to maintain its temperature for a longer period of time. Molding techniques, such as injection, vacuum and thermoforming, are suitable for forming the liners. Of these techniques, injection molding is preferred.

Moreover, the liners may be formed of a laminate of various materials, including a foamed polystyrene core, preferably covered on the interior side with a smooth and impervious layer of plastic. The exterior surface can be covered with the same or different layer of plastic or with a metallic foil or paper covering.

The cavities 20, 30 and liner 40 may be of any conforming shapes. However, preferably, they are of an asymmetric shape, such that the liner 40 fits into the cavities 20, 30, respectively, only in a position which naturally guides the raised portions 26, 36 of the cavities 20, 30, respectively, to interlock with the depressions 48 of the liner 40. The rectangular shape employed in FIGS. 1-6 is an example of an appropriately asymmetric shape. In contrast, a circular liner and cavity would make it more difficult to quickly guide a depression onto a protrusion from the cavity.

Figure 6:
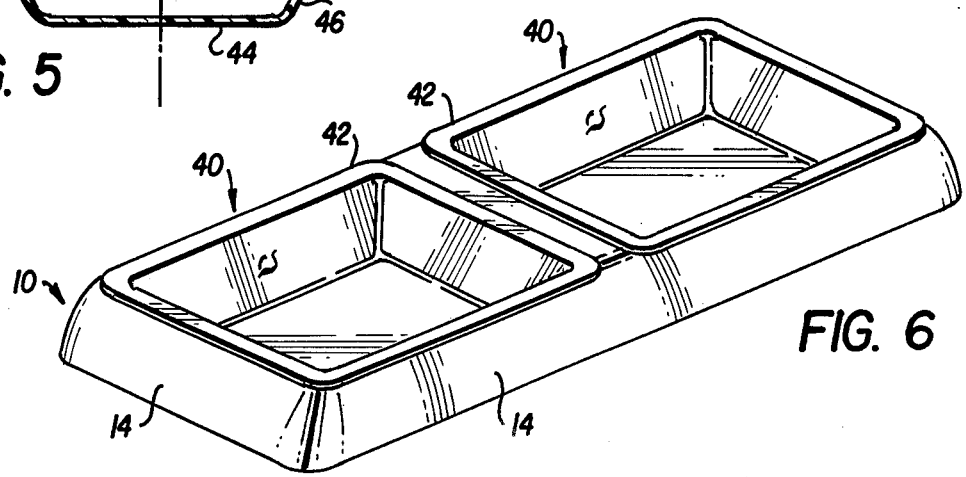
FIG. 6 is a perspective view of two liners of FIG. 4 inserted into the pet dish holder of FIG. 1.
Figure 7:
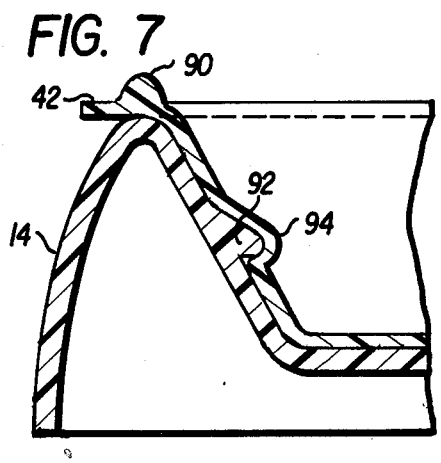
FIG. 7 is an enlarged view showing a first embodiment of a means for attaching the liner to the pet dish holder.
Figure 8:
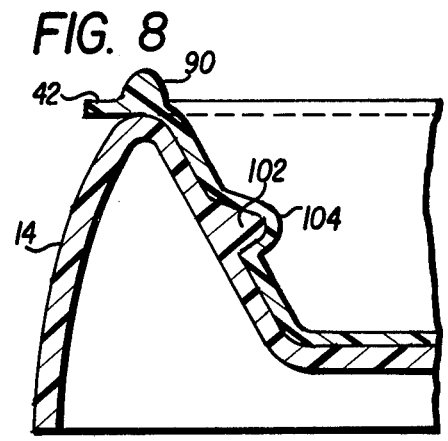
FIG. 8 shows a second embodiment of a means for attaching the liner to the pet dish holder.

FIGS. 6-8 show that, preferably, the rim 42 of the liner 40 extends laterally beyond at least a portion of the outer walls 14 of holder 10. Extending the rim 42 beyond the outer walls 14 makes it easy for a person to grasp the liner 40 to engage and disengage it from the holder 10.

Although FIGS. 1-3 and 6 show a holder 10 provided with two liners 40, the present invention also encompasses a holder 10 sized for only one liner 40.

FIGS. 7 and 8 show detailed views of embodiments of the depression 48 of the liner 40 and raised portions or mounds 26, 36 of holder 10. The mound and raised portion can be either sloping on an upper portion and flat on a lower portion, as shown by depression 92 and raised portion 94 of FIG. 7, or can be sloped on both portions, as shown by depression 104 and mound 102 of FIG. 8.

Figure 9:
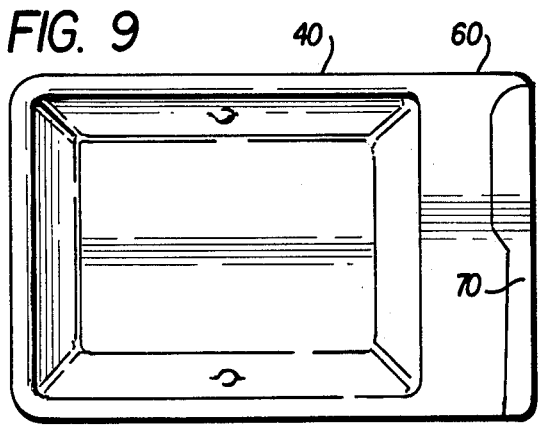
FIG. 9 shows the pet dish liner and a knife monolithically molded as one piece.
Figure 10:
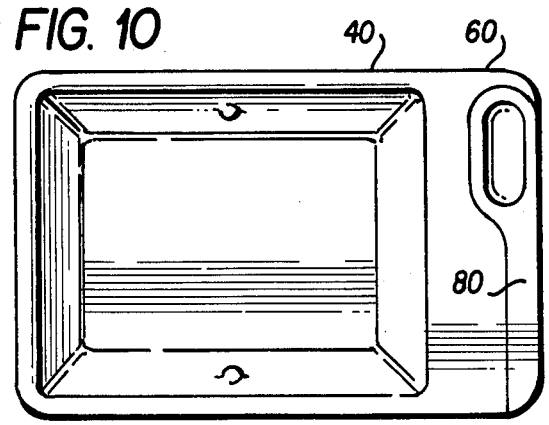
FIG. 10 shows the pet dish liner and a spoon monolithically molded as one piece.

Most preferably, the liner 40 and a utensil are monolithically injection-molded as one piece 60, shown in FIGS. 9 and 10. The utensil, is preferably, either a knife (spatula) 70, spoon 80 or combination spoon with tines (not shown) capable of being used as both spoon and fork. The monolithically molded piece 60 is further provided with a frangible connection, such as an area of reduced thickness, or perforations, which define the knife (spatula) 70 or spoon 80, so that it may be detached from the molded piece 60.

The present invention has the advantage that it is extremely convenient to use. By providing a utensil attached to the molded liner, it provides both a disposable liner together with a disposable utensil, thus eliminating the need for cleanup of the various implements needed to dispense food into a pet dish. Furthermore, by shaping both the dish holder cavity and the liner in an asymmetric shape, it makes it easy for the user to insert the liner into the cavity so it inherently must lock the depressions of the liner and the raised portions or mounds of the holder. Because the depressions are directed to the protruding portions, it is only necessary to provide small deressions and protrusions. In contrast, U.S. Pat. No. 3,698,594 employs a round dish, and thus uses a raised portion which circumscribes the entire sidewalls of a liner because, otherwise, it would be difficult for the raised portion on the dish to find the locking portion of its respective holder. However, this locking system creates a problem in disengaging the liner from the holder. By employing only small interlocking areas, preferably less than 10% of the perimeter for each interlocking area, it is easier to attach and detach the liner of the present invention.

FIGS. 7 and 8 also show a raised extension 90 attached to the rim 42. Extension 90 provides an additional handle for a person to hold the liner 40 when disengaging it from the holder 10.

The present invention also has an advantage that it provides the means for attaching and detaching the liner from the holder at the middle of the sidewalls of the liner and holder. Thus, a person can exert additional leverage when pushing the rim of the liner inwardly to disengage the liner from the holder.

While specific embodiment of the present invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. A disposable pet dish, comprising:
a pet dish liner comprising a bottom wall and sidewalls terminating in a rim having a lip, said lip lying generally in a plane and projecting outwardly from a nominal centerline of said liner intersecting said plane, and at least two discrete depressions protruding inwardly from opposing sidewalls, said liner being monolithically formed of one piece; and
a pet dish holder comprising sidewalls and a bottom wall attached to said sidewalls, said sidewalls defining an inner perimeter of said holder, said sidewalls extending upwardly and outwardly terminating in a rim having a lip projecting outwardly therefrom, a downwardly and outwardly extending outer wall attached to said lip of said holder, and a raised mound for each of said depressions, said raised mound protruding inwardly from opposing sidewalls of said holder and located to detachable insert into said depression, said bottom and sidewalls of said holder being sized and shaped to support said liner bottom and sidewalls, with at least a portion of said liner lip being vertically disposed above each of said depressions, and said lip of said liner sized to project outwardly beyond said holder lip.

2. The dish of claim 1, wherein said liner bottom wall and said holder bottom wall are asymmetrically shaped to guide each said depression onto said raised mound.

3. The dish of claim 2, wherein said liner is made of flexible material and said asymmetric shape is rectangular.

4. The dish of claim 2, wherein said holder is shaped and sized to accommodate at least two liners.

5. The dish of claim 2, wherein said liner lip further comprises upwardly extending projections located above each of said depressions.

6. The dish of claim 2, further comprising a utensil detachably attached to said liner.

7. The dish of claim 6, wherein said liner and utensil are molded as one piece and said utensil is attached to said liner by a frangible connection, along which said utensil is detachable.

8. The dish of claim 7, wherein said utensil is a knife.

9. The dish of claim 7, wherein said utensil is a spoon.

10. The dish of claim 2, wherein said liner is made of a laminate of a foamed polystyrene core covered on the interior side with a smooth and impervious layer of plastic.

11. The dish of claim 10, wherein the exterior side of said liner is covered with a member selected from the group of said smooth and impervious plastic, metallic foil and paper.

12. A pet dish liner, comprising a bottom wall, sidewalls terminating in a rim having a lip said lip lying generally in a plane and projecting outwardly from a nomical centerline of said liner intersecting said plane, and at least two discrete depressions protruding inwardly from opposing sidewalls, said depressions occupying less than 10% of the perimeter of said liner, and lying below at least a portion of said outwardly projecting lip said liner being monolithically formed of one piece.

13. The liner of claim 12, wherein said liner is made of flexible material and has an asymmetric shape.

14. The liner of claim 13, wherein said liner lip further comprises upwardly extending projections located above each of said depressions.

15. The liner of claim 13, further comprising a utensil detachably attached to said liner, wherein said liner and utensil are molded as one piece and said utensil is attached to said liner by a frangible connection, along which said utensil is detachable.

16. The liner of claim 15, wherein said utensil is selected from the group consisting of a knife, fork or spoon.

17. The liner of claim 13, wherien said asymmetric shape is rectangular and said liner is made of a laminate of a foamed polystyrene core covered on the interior side with a smooth and impervious layer of plastic.

18. The liner of claim 17, wherein the exterior side of said liner is covered with a member selected from the group consisting of said smooth and impervious plastic, metallic foil and paper.

19. A disposable pet dish, comprising:
a pet dish liner comprising a rectangular bottom wall, sidewalls terminating in a rim having a lip projecting outwardly therefrom, and two depressions protruding inwardly from opposing sidewalls, a utensil attached to said liner, said liner and utensil being monolithically molded of one piece and said utensil being attached to said liner by a frangible connection, thereby allowing said utensil to be detached.

a pet dish holder comprising a rectangular bottom wall, attached to sidewalls extending upwardly and outwardly and terminating in a rim having a lip projecting outwardly therefrom, a downwardly and outwardly extending outer wall attached to said lip of said dish holder, and a raised portion of each of said depressions, said raised portion protruding inwardly from opposing sidewalls of said holder and located to detachably insert into said depressions, said flat bottom and sidewalls of said holder being sized to support said liner bottom and sidewalls; and wherein at least a portion of said liner lip is positioned above each of said depressions and that portion of said liner lip extends outwardly beyond said holder lip and is spaced from said outer wall.

* * * * *